US012601314B2

(12) United States Patent
Lapsa et al.

(10) Patent No.: US 12,601,314 B2
(45) Date of Patent: Apr. 14, 2026

(54) REUSABLE UPPER STAGE ROCKET

(71) Applicant: STOKE Space Technologies, Inc., Kent, WA (US)

(72) Inventors: Andrew Lapsa, Seattle, WA (US); Thomas Feldman, Kent, WA (US)

( * ) Notice: Subject to any disclaimer, the term of this patent is extended or adjusted under 35 U.S.C. 154(b) by 0 days.

(21) Appl. No.: 18/806,257

(22) Filed: Aug. 15, 2024

(65) Prior Publication Data

US 2024/0401548 A1 Dec. 5, 2024

Related U.S. Application Data

(63) Continuation of application No. 17/407,472, filed on Aug. 20, 2021, now Pat. No. 12,085,044, which is a continuation of application No. PCT/US2020/048178, filed on Aug. 27, 2020.

(60) Provisional application No. 62/941,386, filed on Nov. 27, 2019.

(51) Int. Cl.
*F02K 9/97* (2006.01)
*B64G 1/00* (2006.01)

(52) U.S. Cl.
CPC ............... *F02K 9/97* (2013.01); *B64G 1/006* (2023.08); *F05D 2240/1281* (2013.01)

(58) Field of Classification Search
CPC ... F02K 9/64; F02K 9/97; F02K 9/972; B64G 1/006; F05D 2240/1281
See application file for complete search history.

(56) References Cited

U.S. PATENT DOCUMENTS

| | | | |
|---|---|---|---|
| 3,093,346 A | 6/1963 | Faget et al. | |
| D201,773 S | 7/1965 | Bono | |
| 3,270,501 A | 9/1966 | Webb | |
| 3,295,790 A | 1/1967 | Bono | |
| 3,314,609 A * | 4/1967 | Horgan | F02K 9/84 |
| | | | 239/265.33 |

(Continued)

FOREIGN PATENT DOCUMENTS

| | | |
|---|---|---|
| CN | 102828851 A | 12/2012 |
| CN | 209637832 U | 11/2019 |

(Continued)

OTHER PUBLICATIONS

Korte, J.J., Multidisciplinary Approach to Aerospike Nozzle Design, Feb. 1997, NASA Technical Memorandum 110326 (Year: 1997).*

(Continued)

*Primary Examiner* — Kyle Robert Thomas

(74) *Attorney, Agent, or Firm* — Patrick D. Duplessis

(57) ABSTRACT

A reusable upper stage rocket or other atmospheric re-entry vehicle includes a nose, a base opposite the nose, and a propulsion engine toward the base. The propulsion engine includes a high pressure chamber and a nozzle configured to exhaust gas generated by the high pressure chamber. The nozzle includes an initial nozzle portion, a secondary nozzle portion downstream of the initial nozzle portion, and a nozzle exit at a downstream end of the secondary nozzle portion. The secondary nozzle portion includes an inner expansion surface, an outer expansion surface outboard of the inner expansion surface, and an expansion cavity defined between the inner expansion surface and the outer expansion surface.

69 Claims, 6 Drawing Sheets

(56) References Cited

U.S. PATENT DOCUMENTS

| | | | | |
|---|---|---|---|---|
| 3,780,968 | A | 12/1973 | Parilla | |
| 3,888,419 | A * | 6/1975 | McCullough | F02K 9/84 |
| | | | | 239/265.19 |
| 3,929,289 | A | 12/1975 | Kardon et al. | |
| 3,940,067 | A * | 2/1976 | Cherry | F02K 9/974 |
| | | | | 60/253 |
| 4,273,304 | A | 6/1981 | Frosch et al. | |
| 4,605,184 | A | 8/1986 | Kim | |
| 4,802,629 | A | 2/1989 | Klees | |
| 5,201,832 | A | 4/1993 | Porter | |
| 5,463,866 | A | 11/1995 | Klees | |
| 5,568,901 | A | 10/1996 | Stiennon | |
| 6,059,235 | A | 5/2000 | Meissinger et al. | |
| 6,119,985 | A | 9/2000 | Clapp | |
| 6,213,431 | B1 | 4/2001 | Janeke | |
| 6,516,605 | B1 | 2/2003 | Meholic | |
| 6,629,416 | B1 | 10/2003 | Johnson | |
| 6,964,154 | B1 | 11/2005 | Sackheim et al. | |
| 7,431,242 | B1 | 10/2008 | Brown et al. | |
| 10,773,834 | B2 | 9/2020 | Mbamalu | |
| 2005/0017132 | A1 | 1/2005 | Janeke | |
| 2005/0188677 | A1 | 9/2005 | Nyberg et al. | |
| 2006/0145020 | A1 | 7/2006 | Buehler | |
| 2006/0219846 | A1 | 10/2006 | Johnson et al. | |
| 2007/0012820 | A1 | 1/2007 | Buehler | |
| 2007/0163227 | A1 | 7/2007 | Mano | |
| 2009/0113873 | A1 | 5/2009 | Tweeton | |
| 2009/0145134 | A1 | 6/2009 | Vuillamy et al. | |
| 2012/0023893 | A1 | 2/2012 | Yoo et al. | |
| 2012/0312927 | A1 | 12/2012 | Morris et al. | |
| 2013/0160472 | A1 | 6/2013 | Klimpel | |
| 2015/0285187 | A1 | 10/2015 | Sannino et al. | |
| 2017/0138310 | A1 | 5/2017 | Villarreal et al. | |
| 2018/0057191 | A1 | 3/2018 | Zhang | |
| 2018/0362191 | A1 * | 12/2018 | Russell | F42B 12/66 |
| 2019/0003423 | A1 | 1/2019 | Pelfrey | |
| 2019/0009933 | A1 | 1/2019 | Mbamalu | |
| 2019/0257245 | A1 | 8/2019 | Duge et al. | |
| 2020/0049103 | A1 | 2/2020 | Craddock | |
| 2021/0404420 | A1 | 12/2021 | Johnson | |
| 2024/0151194 | A1 | 5/2024 | Fuller | |

FOREIGN PATENT DOCUMENTS

| | | |
|---|---|---|
| FR | 2542698 A1 | 9/1984 |
| JP | H01164700 A | 6/1989 |
| JP | H-10-503731 A | 4/1998 |
| JP | 2016-500789 A | 1/2016 |

OTHER PUBLICATIONS

Koelle D E: "Entwicklungstendenzen Bei Raumtransport-Systemen", Zeitschrift fur Flugwissenschaften und Weltraumforschung, DFVLR. Koln, DE, vol. 16, No. 2, Apr. 1, 1992(Apr. 1, 1992), pp. 67-76, XP000268629, ISSN: 0342-068X.

Thornton E A: "Thermal Structures: Four Decades of Progress", Journal of Aircraft, AIAA—American Institute of Aeronautics and Astronautics, Inc, US, vol. 29, No. 3, May 1, 1992 (May 1, 1992), pp. 485 498, XP000274400, ISSN: 0021-8669.

G. Hanley and R. Bergeron. "An overview of the Satellite Power System—Transportation system," AIAA 1978-975. 14th Joint Propulsion Conference. Jul. 1978.

Bono, Phil. "The Case for Ballistic Recovery of Boosters." SAE Transactions, vol. 76, 1968, pp. 1479-1494. JSTOR, http://www.jstor.org/stable/44565034. Accessed Oct. 31, 2023.

Chistopher J. Cohan, Walter B. Olstad, Donald W. Patterson, and Robert Salkeld, Space Transportation Systems 1980-2000, Publisher: American Institute of Aeronautics and Astronautics (Jan. 1, 1978), 91 pages, ISBN 0-915928-27-2.

Wang, Ten-See. "Analysis of Linear Aerospike Plume-Induced X-33 Base-Heating Environment." Journal of Spacecraft and Rockets 36 (1998): 777-783.

Campbell, J., Jr. and Cobb, S. M., Aerospike Thrust Chamber Program—Final Report, Rockwell International Corp. Canoga Park, CA, United States, Published Dec. 1, 1976, Report/Patent No. NASA-CR-135169/R76-189, Accession No. 77N21189: Funding Number(s): Contract_Grant: NAS3-20076, 154 pages.

Advanced Aerodynamic Spike Configurations, Technical Report, Rocketdyne Canoga Park CA Canoga Park , Silver, Roy, Nov. 1, 1966 AccessionNo. AD0378296, 411 pages.

Bono, P., "The Case for Ballistic Recovery of Boosters," SAE Technical Paper 670382, 1967, https://doi.org/10.4271/670382, 17 pages.

G. Esnault and F. Rossi, "Design and CFD Analysis of the LOX/LCH4 Dual Regenerative Cooling Circuit of the DEMOP1 Demonstrator," Pangea Aerospace, Calle Roc Boronat, 117, 08018 Barcelona, Spain.

NASA Technology Roadmaps, TA 9: Entry, Descent, and Landing Systems, Jul. 2015, 125 pages.

The M-1 Rocket Engine, Technical Report, Aeroject-General Corporation under Contract NAS 3-2555, 29 pages.

Charczenko, N., Hennessey, K. W., & United States. (1961). Investigation of a retrorocket exhausting from the nose of a blunt body into a supersonic free stream. Washington, D.C: National Aeronautics and Space Administration.

Romeo, D. J., Sterrett, J. R., United States., & Langley Research Center. (1963). Exploratory investigation of the effect of a forward-facing jet on the bow shock of a blunt body in a Mach No. 6 free stream. Washington, D.C: National Aeronautics and Space Administration.

Hall, Joshua N., "Optimized Dual Expander Aerospike Rocket" (2011). Theses and Dissertations. 1326. https://scholar.afit.edu/etd/1326.

Onofri, M., Calabro, M.J., Hagemann, G.S., Immich, H., Sacher, P.W., Nasuti, F., & Reijasse, P. (2006). Plug Nozzles: Summary of Flow Features and Engine Performance.

Rogers A (2023) Spacecraft Recycling: Unveiling the Potential of Reusable Rocket Technology. Adv Automob Eng. 12:225.

Scarborough, R. (1964). Recovery and Reuse of a Two Stage Launch Vehicle.

Danielson, T. (2017). Vehicle Integrated Aerospike for High Mass Mars Missions.

Korzun, A.M. (2008). Supersonic Retropropulsion Technology for Application to High Mass Mars Entry , Descent , and Landing.

Korte, J.J., Salas, A.O., Dunn, H.J., Alexandrov, N.M., Follett, W.W., Orient, G.E., & Hadid, A.H. (1997). Multidisciplinary Approach to Aerospike Nozzle Design.

Hefner, J.N., & Keyes, J.W. (1967). Effect of forward-facing jets on aerodynamic characteristics of blunt configurations at Mach 6. Journal of Spacecraft and Rockets, 4, 533-534.

Simmons, J. R. (2014). Design and Evaluation of Dual-Expander Aerospike nozzle Upper Stage Engine.

Berman, K. and Crimp, F.W., Jr. Performance of Plug-Type Rocket Exhaust Nozzles, ARS Journal, Jan. 1961, pp. 18-23.

Rao, G.V. (1961). Recent Developments in Rocket Nozzle Configurations. ARS Journal, 31, 1488-1494.

Aukerman, C.A. (1991). Plug nozzles: The ultimate customer driven propulsion system.

International Search Report and Written Opinion of the International Searching Authority; Application No. PCT/US 20/48226; Completed: Nov. 12, 2020; Mailing Date: Dec. 15, 2020; 9 Pages.

International Search Report and Written Opinion of the International Searching Authority; Application No. PCT/ US2022/071686; Completed: Nov. 1, 2022; Mailing Date: Nov. 21, 2022; 7 Pages.

International Search Report and Written Opinion of the International Searching Authority; Application No. PCT/ US22/71688; Completed: Nov. 18, 2022; Mailing Date: Dec. 13, 2022; 6 Pages.

Wasko, Robert A.; "Performance of Annular Plug and Expansion-Deflection Nozzles Including External Flow Effects at Transonic Mach Numbers"; NASA Technical Note D-4462; Apr. 1968; 36 Pages [retrieved on Mar. 21, 2023]. Retrieved from the Internet: <https://ntrs.nasa.gov/api/citations/19680010861/downloads/19680010861.pdf>.

Mueller, Thomas J., et al.; "Analytical and Experimental Study of Axisymmetric Truncated Plug Nozzle Flow Fields"; Final Report

(56) References Cited

OTHER PUBLICATIONS

TN-601-FR-10; Prepared by University of Notre Dame for NASA; Sep. 1972; 134 Pages [retrieved on Mar. 21, 2023]. Retrieved from the Internet: <https://ntrs.nasa.gov/api/citations/19730003555/downloads/19730003555.pdf>.

Stitt, Leonard E.; "Exhaust Nozzles for Propulsion Systems With Emphasis on Supersonic Cruise Aircraft"; NASA Reference Publication 1235; May 1990; 107 Pages [retrieved on Mar. 21, 2023]. Retrieved from the Internet: <https://ntrs.nasa.gov/citations/19900011721>.

Aukerman, Carl A.; "Plug Nozzles—The Ultimate Customer Driven Propulsion System"; NASA Contractor Report 187169; AIAA-91-2208; Aug. 1991; 27 Pages [retrieved on Mar. 21, 2023]. Retrieved from the Internet: <https:// ntrs.nasa.gov/citations/19920013861>.

Bradley, Linda L.; "Descriptive Finding Guide for Philip Bono Personal Papers"; Jul. 8, 2016 [retrieved on Mar. 21, 2023]. Retrieved from the Internet: <https://sandiegoairandspace.org/files/Bono,_Philip-FG-SC.10166.doc>.

"Bono, Philip," Web page <http://www.astronautix.com/b/bono.html>, 6 pages [retrieved on Mar. 20, 2023].

"Hyperion SSTO," Web page <http://www.astronautix.com/h/hyperionssto.html>, 3 pages [retrieved on Mar. 20, 2023].

"Ithacus," Web page <http://www.astronautix.com/i/ithacus.html>, 3 pages [retrieved on Mar. 20, 2023].

"Pegasus VTOVL," Web page <http://www.astronautix.com/p/pegasusvtovl.html>, 4 pages [retrieved on Mar. 20, 2023].

"Project Selena," Web page <http://www.astronautix.com/p/projectselena.html>, 3 pages [retrieved on Mar. 20, 2023].

"Rombus," Web page <http://www.astronautix.com/r/rombus.html>, 4 pages [retrieved on Mar. 20, 2023].

"SASSTO," Web page <http://www.astronautix.com/s/sassto.html>, 5 pages [retrieved on Mar. 20, 2023].

"Philip Bono Personal Papers," Web page <https://sandiegoairandspace.org/collection/item/philip-bono-personal-papers>, 5 pages [retrieved on Mar. 21, 2023].

Bono, et al.; Frontiers of Space: The Pocket Encyclopedia of Spaceflight in Color (London, Blandford Press, 1969), pp. 64-66, 68-72, 78, 147-163, 171, 180, 206-207, 246-247. ISBN 0-7137-3504-X.

Select photos from Flickr album entitled "Philip Bono Collection Image," uploaded Jun. 20, 2016 by user "SDASM Archives" [retrieved on Mar. 21, 2023]. Retrieved from Internet: <https://www.flickr.com/photos/sdasmarchives/albums/72157669057850210>.

Automated transcript from YouTube video entitled "How Stoke Space's Unique Rocket Works // Exclusive Tour & Interview," 21 pages, uploaded on Feb. 4, 2023 by user "Everyday Astronaut". Retrieved from Internet: <https:// www.youtube.com/watch?v=EY8nbSwjtEY&t=735s>.

Automated transcript from YouTube video entitled "We are Stoke Space", 2 pages, uploaded on Dec. 17, 2022 by user "Stoke Space". Retrieved from Internet: <https://www.youtube.com/watch?v=VzqhZLgpiv0&t=46s>.

Angelino, Gianfranco; "Approximate Method for Plug Nozzle Design" ; AIAA Journal, vol. 2, Issue 10; Oct. 1964; 2 Pages.

Dnofri, Marcello, et al; "Plug Nozzles: Summary of Flow Features and Engine Performance" ; 40th AIAA Aerospace Sciences Meeting & Exhibit; Reno, NV; Jan. 14, 2002; 27 Pages.

International Search Report and Written Opinion of the International Searching Authority; Application No. PCT/US 20/48178; Completed: Apr. 26, 2021; Mailing Date: May 5, 2021; 8 Pages.

Hudson, G. C., "Phoenix—A commercial, reusable single-stage launch vehicle", Pacific American Launch Systems, Phoenix Reference, 1985.

Hudson, Gary. (1992). History of the Phoenix VTOL SSTO and recent developments in single-stage launch systems.

Undated 1 page engineering document received electronically from third party on Aug. 11, 2025. Document was received as a PDF with the name "PHOENIX2_LINEUP_1988-12 copy.pdf". Applicant does not admit that the document is a "printed publication," publicly accessible, or prior art against any claim, and does not concede any publication date. The inclusion of "Dec. 1988" in the file name is unverified and not accepted by Applicant as a publication date.

* cited by examiner

REUSABLE UPPER STAGE ROCKET

CROSS-REFERENCE TO RELATED APPLICATIONS

The present application is a continuation of pending U.S. patent application Ser. No. 17/407,472, filed Aug. 20, 2021, which is a continuation of International Patent Application No. PCT/US2020/048178, filed on Aug. 27, 2020, which claims the benefit, under 35 U.S.C. § 119(e), of U.S. Provisional Patent Application No. 62/941,386, filed on Nov. 27, 2019. All prior applications are herein incorporated by reference in their entirety.

TECHNICAL FIELD

The present disclosure generally relates to propulsion systems having exhaust nozzles. The present disclosure more particularly relates to an augmented aerospike nozzle, an engine including the augmented aerospike nozzle, and a vehicle including the engine.

BACKGROUND

Aircraft-like reusability for rockets has long been the "holy grail" of rocketry due to the potential for huge cost benefits. The ability to recover and reuse an upper stage rocket of a multi-stage rocket system (e.g., the second stage rocket of a two-stage rocket system) remains a significant technical gap that has not yet been solved by the industry. Reusing the upper stage of a multi-stage rocket is challenging due to the harsh re-entry environment and the performance penalties associated with increased structural mass required for robust reuse. Upper stage rockets are typically constructed with the minimum structure and complexity since any mass addition to the second stage is a 1:1 reduction in payload capacity. Reusing an upper stage rocket therefore requires significant additional functionality but with minimal mass addition.

Traditional upper stage rockets use very large nozzles to maximize engine efficiency in a vacuum. These large nozzles are typically very thin and would be difficult to protect during the re-entry of the upper stage rocket. If the upper stage rocket recovery included a propulsive landing, a separate propulsion system would be required because a large nozzle would incur severe flow separation and side loads in the atmosphere.

A plug nozzle, such as the aerospike nozzle, is an altitude compensating nozzle design that minimizes the nozzle efficiency loss due to pressure drag; $P_a-P_e \leq 0$ in the thrust equation $F=\dot{m}V_e-A_e(P_a-P_e)$. This feature also allows the nozzle to operate inside the atmosphere at a low throttle level, whereas flow separation would occur in traditional high expansion ratio nozzles resulting in unsteady thrust oscillations, unsteady thrust vector, and engine or vehicle damage.

The aerospike nozzle has been studied since before 1960. Analytical design methods (e.g., G. Angelino, Approximate Method for Plug Nozzle Design, AIAA Journal, Vol. 2, Issue 10, pp. 1834-1835 (1964)) and modern first-principles design tools (e.g., NASA's Aerospike Design and Performance Tool (ADAPT) tool, 2008) have been developed, and computational fluid dynamics (CFD) predictive analysis has been performed (e.g., M. Onofri et al., Plug Nozzles: Summary of Flow Features and Engine Performance, AIAA-2002-0584 (2002)). The aerospike nozzle has also been ground tested in a number of high-profile programs. These include the 25 klbf-thrust aerospike demonstrator developed under the Air Force O2/H2 Advanced Maneuvering Propulsion Technology Program (AFRPL-TR-76-05), the 250 klbf-thrust converted J-2 engine which formed the basis for Rocketdyne's original space shuttle main engine proposal (AFRPL-TR-67-280), and the XRS-2200 linear aerospike nozzle developed as part of the X-33 program, to name a few.

Referring to FIGS. 1-3, the prior art aerospike engine 112 includes at least one high pressure chamber 136 (e.g., a combustion chamber) and an aerospike nozzle 110. The aerospike nozzle 110 includes at least one initial nozzle portion 160 through which exhaust gas initially exits the high pressure chamber 136, and a secondary nozzle portion 162 downstream relative to the initial nozzle portion 160. The initial nozzle portion 160 includes at least one throat 124, one or more surfaces 164, 166 downstream relative to the throat 124, and an outer aft end 168 defined by the throat 124 and/or at least one of the surfaces 164, 166. The secondary nozzle portion 162 includes a centerbody 128 (e.g., an aerospike) defining an inner expansion surface 126.

Referring to FIG. 2, the typical prior art aerospike nozzle 110 includes an initial nozzle portion 160 in the form of a converging-diverging nozzle. In such prior art embodiments, the throat 124 defines a transition between an upstream converging section with opposing converging surfaces 170, 172, and a downstream diverging section with opposing diverging surfaces 164, 166. The diverging surfaces 164, 166 define an initial nozzle cavity 125 therebetween. The inner diverging surface 164 is contiguous with (e.g., at least substantially flush with) the inner expansion surface 126 defined by the centerbody 128 of the secondary nozzle portion 162. The outer aft end 168 of the initial nozzle portion 160 is defined by the aft end of the wall defining the outer diverging surface 166. In some instances, at least a portion of the outer diverging surface 166 is defined by a cowl, a shroud, and/or another component of the vehicle on which the aerospike engine 112 is mounted. In prior art embodiments like the one shown in FIG. 2, the initial nozzle portion 160 is sometimes referred to as a "primary nozzle."

Referring to FIG. 3, in other embodiments of the prior art aerospike nozzle 110, an outer portion of the throat 124 defines the outer aft end 168 of the initial nozzle portion 160. That is, the diverging section of the initial nozzle portion 160 excludes the outer diverging surface 166 included in prior art aerospike nozzles like that shown in FIG. 2.

In some embodiments of the prior art aerospike engine 112, including those shown in FIGS. 1-3, the engine 112 has a so-called "plug cluster" configuration. In these configurations, the engine 112 includes a plurality of discrete high pressure chambers 136 spaced relative to one another and a plurality of discrete initial nozzle portions 160 spaced relative to one another. Each initial nozzle portion 160 is disposed relative to a corresponding high pressure chamber 136, and is configured to exhaust gas exiting the respective high pressure chamber 136. Each high pressure chamber 136 and initial nozzle portion 160 pair is known in the art as a "thrust can." The initial nozzle portion 160 of each thrust can includes a discrete throat 124 that extends annularly about an axis 174 of the initial nozzle portion 160. In such prior art embodiments, the converging surfaces 170, 172 of the throat 124 form a continuous surface that extends annularly about the axis 174, and the diverging surfaces 164, 166 of the throat 124 form a continuous surface that extends annularly about the axis 174. In some instances, the converging surfaces 170, 172 and/or the diverging surfaces 164, 166 are axisymmetric relative to the axis 174. In a toroidal aerospike configuration, such as that shown in FIG. 1, the thrust cans are circumferentially spaced about the centerline 116 of the vehicle on which the engine 112 is disposed. In a linear aerospike configuration, the thrust cans are spaced linearly along a plane parallel to the centerline 116 of the vehicle.

In other embodiments of the prior art aerospike engine 112, the engine 112 includes a single high pressure chamber 136 and a single initial nozzle portion 160 with a single throat 124. In such prior art embodiments, the converging surfaces 170, 172 of the throat 124 are discrete surfaces relative to one another, and the diverging surfaces 164, 166 of the throat 124 are discrete surfaces relative to one another. In a toroidal aerospike configuration, the high pressure chamber 136 and the throat 124 each extend annularly about a centerline 116 of the vehicle on which the engine 112 is disposed. In a linear aerospike configuration, the high pressure chamber 136 and the throat 124 each extend linearly in respective planes parallel to the centerline 116 of the vehicle.

As shown in FIG. 2, during vacuum operation of the typical prior art aerospike engine 112, exhaust gas exits the initial nozzle cavity 125 at $M_1 \geq 1$, expands across Mach waves, and is ejected into the vacuum at $M_2$. The turning angle between $M_1$ and $M_2$ is determined by the Prandtl-Meyer expansion angle $$\theta = v(M_2) - (M_1),$$

where $v(M)$ is the Prandtl-Meyer function:

$$v(M) = \sqrt{\frac{\gamma+1}{\gamma-1}} \tan^{-1}\left[\sqrt{\frac{\gamma-1}{\gamma+1}(M^2-1)}\right] - \tan^{-1}\left(\sqrt{M^2-1}\right).$$

If the engine 112 is operating in a perfect vacuum, the $M_2$ Prandtl-Meyer function approaches the theoretical maximum $$v(M_2) = v(\infty) = 130.45°,$$

and for typical inner module expansion ratios the net turning angle θ can be greater than 90°. The exhaust gas deflects outboard of the outer aft end 168 of the initial nozzle cavity 125, resulting in lost performance for the prior art aerospike engine 112 when operated in a vacuum. To improve performance in a vacuum, it would be necessary to increase the area ratio of the engine 112. This would require the throat 124 to be positioned at a large diameter relative to the centerline 115. However, at large diameters, the dimensions associated with the throat 124 become very small and are difficult to manufacture.

A high-performance nozzle capable of both vacuum and atmospheric operation, and which is easily protectable during re-entry, is needed to allow the efficient recovery and reuse of upper stage rockets.

Aspects of the present invention are directed to these and other problems.

SUMMARY

According to an aspect of the present invention, an augmented aerospike nozzle includes a throat, a centerbody extending aft of the throat, an inner expansion surface defined by the centerbody, an outer expansion surface outboard of the inner expansion surface, and an expansion cavity defined between the inner expansion surface and the outer expansion surface.

According to another aspect of the present invention, an engine includes a high pressure chamber and an augmented aerospike nozzle that exhausts gas generated by the high pressure chamber. The augmented aerospike nozzle includes a throat, a centerbody extending aft of the throat, an inner expansion surface defined by the centerbody, an outer expansion surface outboard of the inner expansion surface, and an expansion cavity defined between the inner expansion surface and the outer expansion surface.

According to another aspect of the present invention, a vehicle includes an engine with a high pressure chamber and an augmented aerospike nozzle that exhausts gas generated by the high pressure chamber. The augmented aerospike nozzle includes a throat, a centerbody extending aft of the throat, an inner expansion surface defined by the centerbody, an outer expansion surface outboard of the inner expansion surface, and an expansion cavity defined between the inner expansion surface and the outer expansion surface.

According to another aspect of the present invention, a reusable upper stage rocket of a multi-stage rocket system includes an engine configured for in-space propulsion and atmospheric landing propulsion.

In addition to, or as an alternative to, one or more of the features described above, further aspects of the present invention can include one or more of the following features, individually or in combination:

a dimension of the centerbody continuously decreases in the aft direction;

the inner expansion surface and the outer expansion surface are configured such that the expansion cavity has a width that continuously increases in the aft direction;

the outer expansion surface extends as far aft as the inner expansion surface;

the outer expansion surface extends further aft than the inner expansion surface;

the inner expansion surface extends further aft than the outer expansion surface;

the expansion cavity extends annularly about the centerbody, and is concentrically aligned with the centerbody about a centerline of the nozzle;

the augmented aerospike nozzle is a linear aerospike nozzle;

the throat is included in an initial nozzle portion of the augmented aerospike nozzle, and the outer expansion surface extends in an aft direction from an outer aft end of the initial nozzle portion;

the vehicle is an upper stage rocket;

the centerbody is a truncated toroidal aerospike having a centerbody base that partially defines the aft end of the vehicle;

the engine is recessed into a base surface of the vehicle;

the outer expansion surface is integrally connected to the vehicle, and the augmented aerospike nozzle includes a seal that allows the centerbody to gimbal while allowing the outer expansion surface to remain fixed with respect to the vehicle; and a seal permits the engine to gimbal relative to the vehicle.

These and other aspects of the present invention will become apparent in light of the drawings and detailed description provided below.

DETAILED DESCRIPTION

Figure 4:
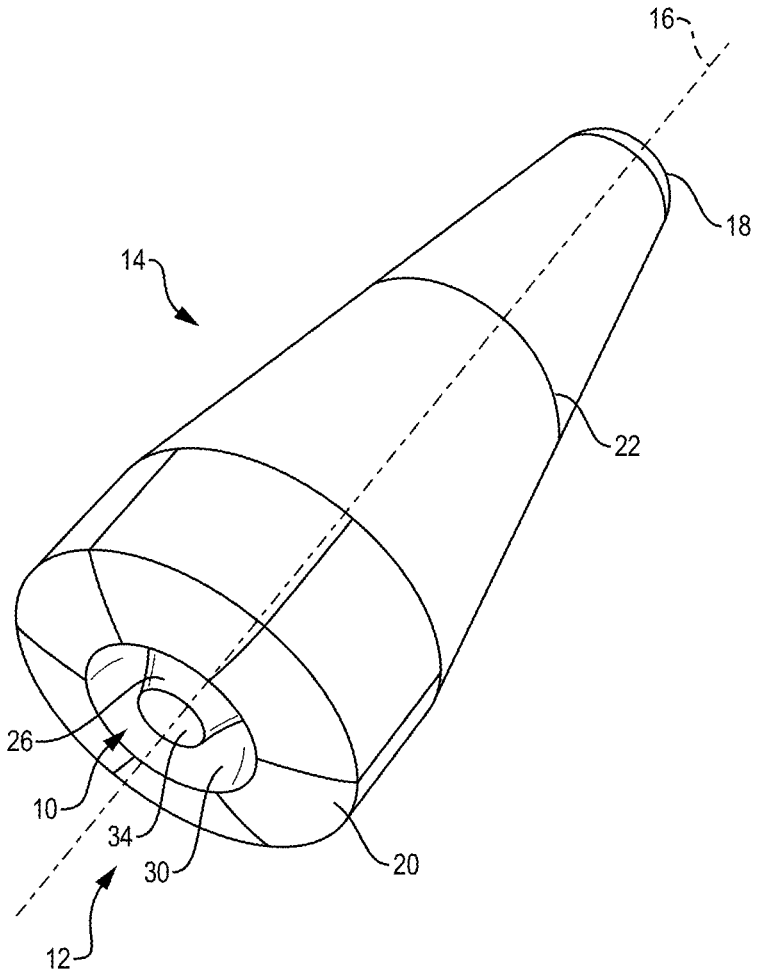
FIG. 4 is a perspective view of a vehicle including an engine with an augmented aerospike nozzle.
Figure 5:
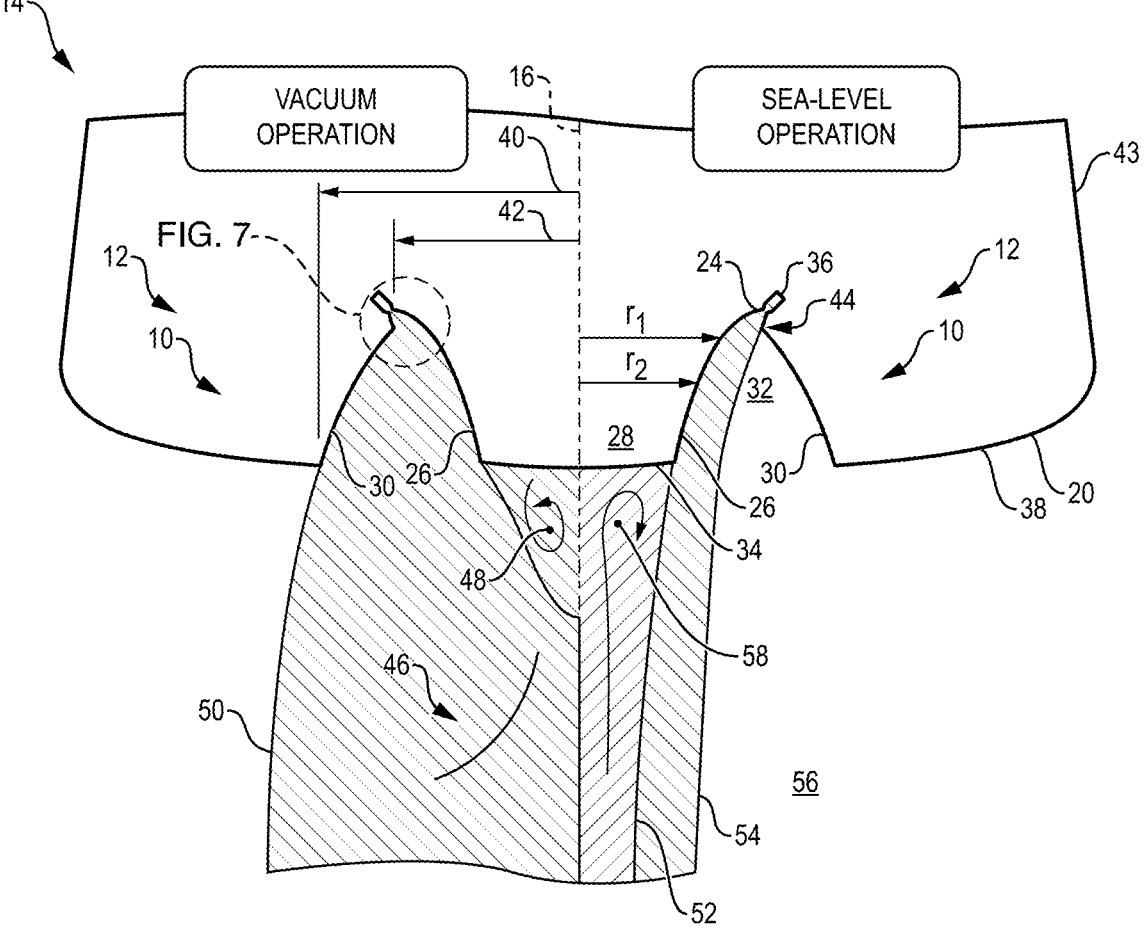
FIG. 5 is a schematic sectional view of a portion of the vehicle of FIG. 4 during vacuum operation (left of centerline) and atmospheric operation (right of centerline).

Referring to FIGS. 4 and 5, the present disclosure describes an augmented aerospike nozzle 10, an engine 12 including the augmented aerospike nozzle 10, and a vehicle 14 including the engine 12.

Figure 6:
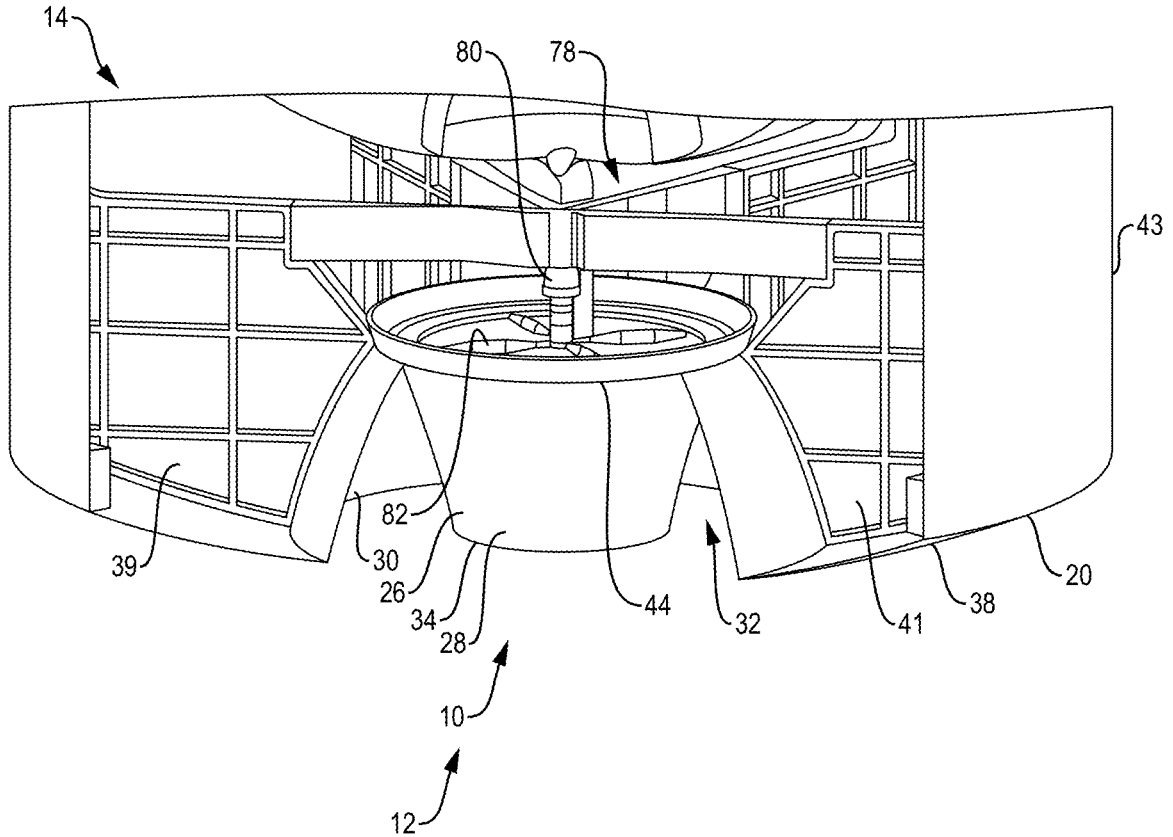
FIG. 6 is a sectional perspective view of the aft portion of the vehicle of FIG. 4.

Referring to FIGS. 4-6, the vehicle 14 is a rocket (e.g., a multi-stage rocket, a single-stage-to-orbit (SSTO) rocket, an upper stage rocket, a booster rocket, etc.), a missile, a spacecraft, an aircraft, or another vehicle designed for travel (e.g., flight) up to at least supersonic speeds (e.g., supersonic speeds, hypersonic speeds, re-entry speeds, etc.) in atmospheric, sub-orbital, orbital, and/or outer space environments. In the illustrated embodiment, the vehicle 14 is a second stage rocket of a two-stage rocket (not shown). The vehicle 14 (hereinafter the "second stage rocket 14") extends along a centerline 16 between a forward end 18 and an opposing aft end 20 thereof. The second stage rocket 14 includes a payload 22 toward the forward end 18, and the engine 12 toward the aft end 20.

Figure 7:
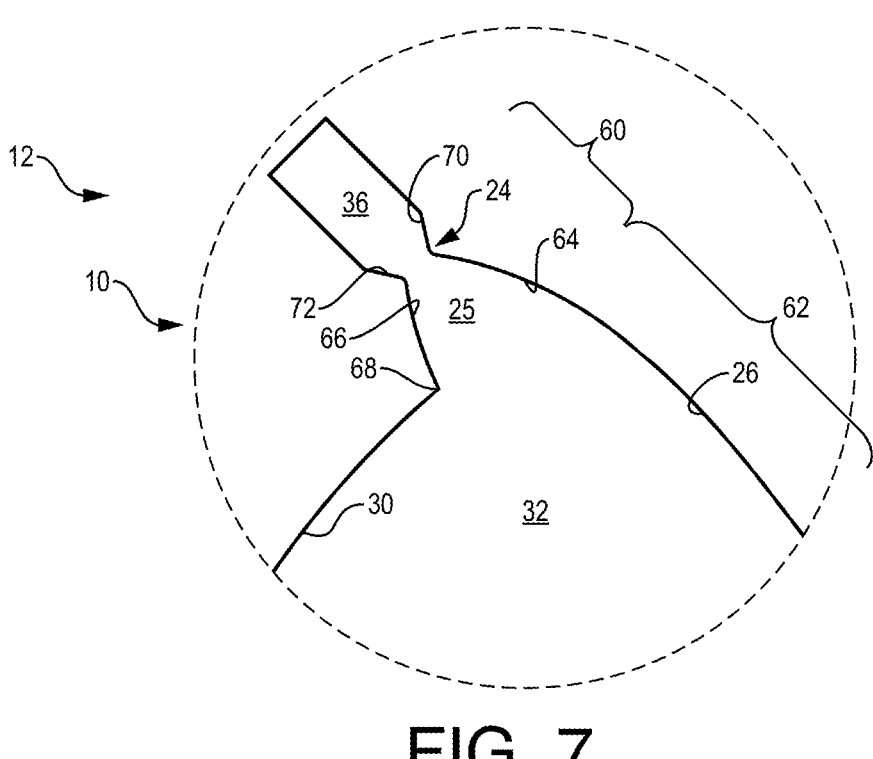
FIG. 7 schematically illustrates a portion of the augmented aerospike engine of FIG. 4.
Figure 8:
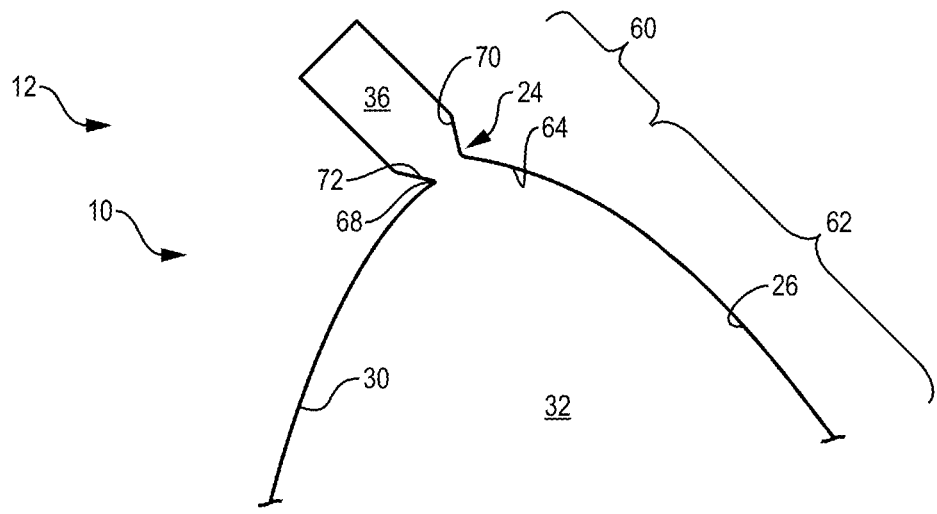
FIG. 8 schematically illustrates a portion of another augmented aerospike engine.

Referring to FIGS. 7 and 8, the augmented aerospike nozzle 10 includes at least one initial nozzle portion 60 through which exhaust gas initially exits at least one high pressure chamber 36, and a secondary nozzle portion 62 downstream relative to the initial nozzle portion 60.

The initial nozzle portion 60 includes at least one throat 24, one or more surfaces 64, 66 extending downstream relative to the throat 24, and an outer aft end 68 defined by the throat 24 and/or at least one of the surfaces 64, 66. The secondary nozzle portion 62 includes a centerbody 28 (e.g., an aerospike) defining an inner expansion surface 26. The secondary nozzle portion 62 also includes an outer expansion surface 30 outboard of the inner expansion surface 26, and an expansion cavity 32 defined between the inner expansion surface 26 and the outer expansion surface 30.

Referring to FIG. 7, in some embodiments, the initial nozzle portion 60 of the nozzle 10 is in the form of a converging-diverging nozzle and/or a primary nozzle. In such embodiments, the throat 24 defines a transition between an upstream converging section with opposing converging surfaces 70, 72, and a downstream diverging section with opposing diverging surfaces 64, 66. The diverging surfaces 64, 66 define an initial nozzle cavity 25 therebetween. The inner diverging surface 64 is contiguous with (e.g., at least substantially flush with) the inner expansion surface 126 defined by the centerbody 128 of the secondary nozzle portion 62. The outer expansion surface 30 is connected (e.g., connected directly, connected indirectly via a seal, etc.) and extends in the aft direction from the outer aft end 68 of the initial nozzle portion 60, which is defined by the aft end of the outer diverging surface 66. An inflection point is defined where the outer diverging surface 66 of the initial nozzle portion 60 meets the outer expansion surface 30 of the secondary nozzle portion 62.

Referring to FIG. 8, in other embodiments, the initial nozzle portion 60 is configured such that an outer portion of the throat 24 defines the outer aft end 68 of the initial nozzle portion 60. That is, the initial nozzle portion 60 excludes the outer diverging surface 66 included in nozzles like that shown in FIG. 7. The outer expansion surface 30 is connected (e.g., connected directly, connected indirectly via a seal, etc.) and extends in the aft direction from the outer aft end 68 of the initial nozzle portion 60.

Referring back to FIGS. 5 and 6, the centerbody 28 that defines the inner expansion surface 26 of the augmented aerospike nozzle 10 is an aerospike (e.g., toroidal aerospike, linear aerospike) or another type of plug nozzle. The contour of the inner expansion surface 26 will depend on the particular application, and can be selected and/or optimized using methods by Angelino (1964) and/or other methods known in the art. In the illustrated embodiments, the centerbody 28 is a truncated toroidal aerospike having a centerbody base 34 that partially defines the aft end 20 of the second stage rocket 14. The radius $r_1$ of a forward portion of the centerbody 28 is greater than the radius $r_2$ of an aft portion of the centerbody 28. A dimension of the centerbody 28 (e.g., the radius) continuously decreases in the aft direction.

The inner and outer expansion surfaces 26, 30 of the secondary nozzle portion 62 of the augmented aerospike nozzle 10 are configured such that the expansion cavity 32 defined therebetween has a width (e.g., a dimension in the direction perpendicular to the centerline 16) that increases (e.g., continuously increases) in the aft direction. The contour of the outer expansion surface 30 will depend on the particular application, and can be selected and/or optimized using methods by Angelino (1964) and/or other methods known in the art. That is, known methods for selecting and/or optimizing the contour of the inner expansion surface 26 can be applied when selecting and/or optimizing the contour of the outer expansion surface 30. In some embodiments, including the illustrated embodiments, the outer expansion surface 30 extends as far aft as the inner expansion surface 26. In other embodiments not shown in the drawings, the outer expansion surface 30 extends further aft than the inner expansion surface 26, or the inner expansion surface 26 extends further aft than the outer expansion surface 30. In the illustrated embodiments, the expansion cavity 32 extends annularly about the centerbody 28, and is concentrically aligned with the centerbody 28 about the centerline 16 of the second stage rocket 14.

The engine 12 includes the high pressure chamber 36 (e.g., a combustion chamber) and the augmented aerospike nozzle 10. The high pressure chamber 36 generates gas that is exhausted through the augmented aerospike nozzle 10.

The high pressure chamber 36 is in the form of an annular ring, a segmented ring, individual thrust chambers, or any other configuration providing supersonic flow to the inner expansion surface 26 and the outer expansion surface 30.

Referring to FIGS. 7 and 8, in the illustrated embodiments, the engine 12 includes a single high pressure chamber 36 and a single initial nozzle portion 60 with a single throat 24. The nozzle 10 is in the form of a toroidal aerospike. As such, the high pressure chamber 36 and the throat 24 each extend annularly about the centerline 16 of the second stage rocket 14 (see FIGS. 4-6). The converging surfaces 70, 72 of the throat 24 are discrete surfaces relative to one another. In the embodiment of FIG. 8, the diverging surfaces 64, 66 of the throat 24 are also discrete surfaces relative to one another.

Figure 1:
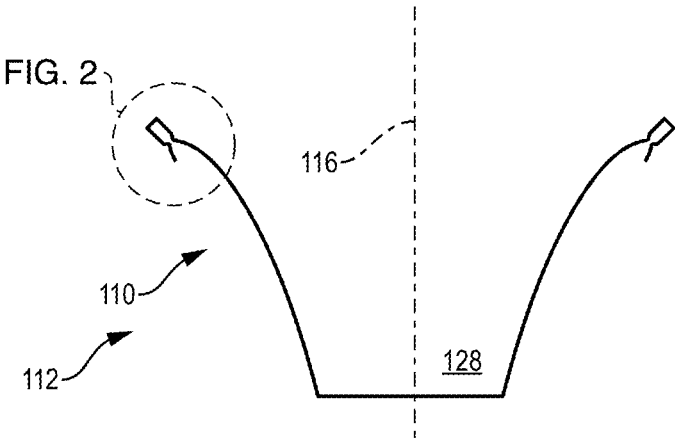
FIG. 1 schematically illustrates a prior art aerospike engine.
Figure 2:
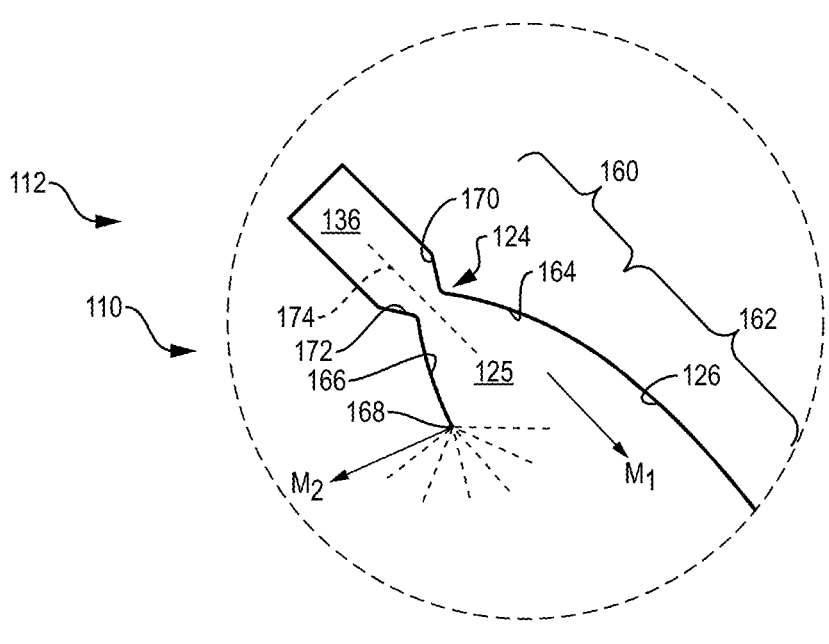
FIG. 2 schematically illustrates a portion of the prior art aerospike engine of FIG. 1.
Figure 3:
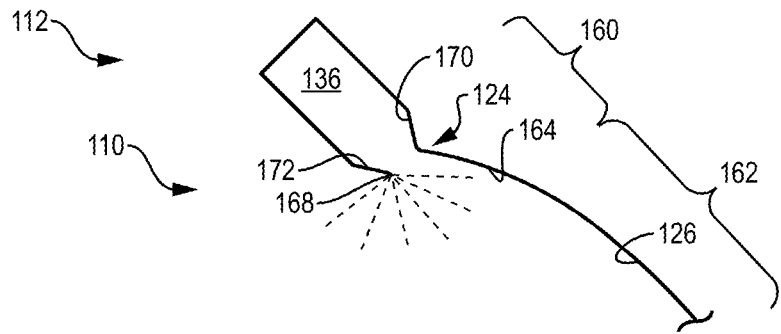
FIG. 3 schematically illustrates a portion of another prior art aerospike engine.

In other embodiments, the engine 12 has a so-called "plug cluster" configuration similar to that of the prior art embodiment illustrated in FIGS. 1 and 2, for example. In such embodiments, the engine 12 includes a plurality of discrete high pressure chambers 36 spaced relative to one another, and a plurality of discrete initial nozzle portions 60 spaced relative to one another. Each initial nozzle portion 60 is disposed relative to a corresponding high pressure chamber 36, and is configured to exhaust gas exiting the respective high pressure chamber 36. Each high pressure chamber 36 and initial nozzle portion 60 pair forms a so-called "thrust can." The initial nozzle portion 60 of each thrust can includes a discrete throat 24 that extends annularly about an axis of the respective initial nozzle portion 60. The converging surfaces 70, 72 of the throat 24 form a continuous surface that extends annularly about the axis of the respective initial nozzle portion 60. In some instances, the converging surfaces 70, 72 and/or the diverging surfaces 64, 66 are axisymmetric relative to the axis 74. In a toroidal aerospike configuration, the thrust cans are circumferentially spaced about the centerline 16 of the second stage rocket 14. In a linear aerospike configuration, the thrust cans are spaced linearly along a plane parallel to the centerline 16 of the second stage rocket 14.

In some embodiments, the engine 12 is recessed into the base surface 38 of the second stage rocket 14 to protect portions of the engine 12 from a highly-loaded environment, such as during re-entry into the atmosphere.

Referring to FIGS. 7 and 8, the outer expansion surface 30 of the augmented aerospike nozzle 10, which is absent in prior art aerospike nozzles, captures the flow of exhaust gas and turns it in the axial direction, generating additional thrust. This significantly increases the expansion area 40 (and thus expansion ratio) of the nozzle 10 during vacuum operation without compromising the throat radial location 42 (see FIG. 5). This improves performance of the engine 12 without sacrificing the length of the engine 12 or the diameter of the high pressure chamber 36. Traditionally, the expansion area 40 would be a function of throat radial location 42, and further increases in expansion area 40 would require increases in throat radial location 42 resulting in very small dimensions of the throat 24 for a fixed thrust.

Referring to FIGS. 5 and 6, in the illustrated embodiment, the outer expansion surface 30 is integrally connected to the second stage rocket 14 via beams 39, 41 extending radially between the augmented aerospike nozzle 10 and the sidewall 43 of the second stage rocket 14. The beams 39, 41 also support the thrust takeout structure 78 on which the engine 10 is mounted via a gimbal 80 and a plurality of struts 82. The nozzle 10 includes a seal 44 (e.g., hot gas seal formed by metal bellows) that allows the centerbody 28 to gimbal while allowing the outer expansion surface 30 to remain fixed with respect to the second stage rocket 14. The seal 44 extends between forward end of the outer expansion surface 30 and the outer aft end 68 of the initial nozzle portion 60. In other embodiments not shown in the drawings, the seal 44 is positioned in another location (e.g., where the aft end of the outer expansion surface 30 abuts the base surface 38 of the second stage rocket 14) to permit gimballing of the entire augmented aerospike nozzle 10 (including the outer expansion surface) relative to the sidewall 43 of the second stage rocket 14.

During vacuum operation (see FIG. 5, left of the centerline 16), high pressure gas exits the high pressure chamber 36 and expands along the inner expansion surface 26 and the outer expansion surface 30 to produce axial thrust at high efficiency. Low pressure in the region downstream of the centerbody base 34 allows for closed wake operation of the nozzle 10. A recompression wave 46 emanates from the closed wake region 48. The in-vacuum jet boundary 50 continues to expand beyond the edge of the outer expansion surface 30. During atmospheric (e.g., sea-level) operation (see FIG. 5, right of the centerline 14), hot gas exits the high pressure chamber 36 and expands along the inner expansion surface 26 but does not interact with the outer expansion surface 30. The gas jet boundaries 52, 54 are determined by pressure in the local atmosphere 56 and the pressure in the open wake 58 downstream of the centerbody base 34.

The engine 12 with the augmented aerospike nozzle 10 therefore provides many advantages over prior art nozzles, and does so with a form factor that is substantially shorter than other prior art nozzles. The approximate doubling of the nozzle expansion area ratio increases the nozzle vacuum efficiency and raises the engine specific impulse by ten or more seconds, providing in-space performance commensurate with industry-leading upper stage engines. The recessing of the nozzle 10 into the second stage rocket 14 improves ground clearance and reduces local heating effects. The remainder of the vehicle base 20 may be actively cooled using the heat shielding system disclosed in the commonly-assigned U.S. Provisional Patent Application No. 62/942,886, filed Dec. 3, 2019, the contents of which are hereby incorporated by reference in their entirety. The vehicle base 20 can therefore provide a robust barrier that protects the second stage rocket 14 from surface ejecta generated when landing on unprepared planetary surfaces. These features enable the second stage rocket 14 to perform a base-first atmospheric re-entry trajectory with low-throttle terminal descent burns, and to make a soft vertical landing, with a single propulsion engine. This provides several key advantages over other proposed nose-first or body-first (a/k/a belly flop) strategies: (i) it eliminates the need for multiple engines dedicated to in-space and in-atmosphere operation, reducing mass and part count while improving overall system performance; (ii) it eliminates the need for challenging in-atmosphere reorientation maneuver required for nose-first re-entry vehicles with vertical landing profiles; (iii) it keeps the primary load paths in the axial direction during all phases of flight, allowing for a more efficient structural solution; (iv) the common vertical orientation during ascent and re-entry simplifies the cryogenic fluid management challenge by minimizing slosh and associated boil-off; (v) it minimizes the heat shield surface area while also maintaining a low ballistic coefficient, minimizing the overall heat load managed by the vehicle during re-entry.

While several embodiments have been disclosed, it will be apparent to those having ordinary skill in the art that aspects of the present invention include many more embodiments. Accordingly, aspects of the present invention are not to be restricted except in light of the attached claims and their equivalents. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

What is claimed is:
1. A multi-stage rocket, comprising:
a lower stage rocket; and an upper stage rocket separable from the lower stage rocket, the upper stage rocket including:

a nose;

a base opposite the nose; and a propulsion engine toward the base, the propulsion engine including:

a high pressure chamber; and an aerospike nozzle configured to exhaust gas generated by the high pressure chamber, the aerospike nozzle including:

a converging-diverging nozzle portion;

a secondary nozzle portion downstream of the converging-diverging nozzle portion, the secondary nozzle portion including an inner expansion surface, an outer expansion surface outboard of the inner expansion surface, and an expansion cavity defined between the inner expansion surface and the outer expansion surface; and a nozzle exit at a downstream end of the secondary nozzle portion.

2. The multi-stage rocket of claim 1, wherein the aerospike nozzle further includes an inflection point defined where the converging-diverging nozzle portion meets the outer expansion surface of the secondary nozzle portion.

3. The multi-stage rocket of claim 2, wherein the converging-diverging nozzle portion includes a converging section, a diverging section downstream of the converging section, and a throat that defines a transition between the converging section and the diverging section;

wherein the diverging section of the converging-diverging nozzle portion includes an inner diverging surface and an outer diverging surface;

wherein the inner expansion surface of the secondary nozzle portion extends downstream of the inner diverging surface of the converging-diverging nozzle portion; and wherein an inflection point is defined where the outer diverging surface of the converging-diverging nozzle portion meets the outer expansion surface of the secondary nozzle portion.

4. The multi-stage rocket of claim 1, wherein the base includes a first base portion inboard of the nozzle exit and a second base portion outboard of the nozzle exit;

wherein the secondary nozzle portion includes a centerbody; and wherein the centerbody includes a centerbody sidewall that defines the inner expansion surface and a centerbody base that defines the first base portion.

5. The multi-stage rocket of claim 4, wherein the converging-diverging nozzle portion includes a converging section, a diverging section downstream of the converging section, and a throat that defines a transition between the converging section and the diverging section;

wherein the diverging section of the converging-diverging nozzle portion includes an inner diverging surface and an outer diverging surface;

wherein the inner expansion surface of the secondary nozzle portion extends downstream of the inner diverging surface of the converging-diverging nozzle portion; and wherein an inflection point is defined where the outer diverging surface of the converging-diverging nozzle portion meets the outer expansion surface of the secondary nozzle portion.

6. The multi-stage rocket of claim 4, wherein the centerbody is a truncated toroidal aerospike.

7. The multi-stage rocket of claim 4, wherein the expansion cavity of the secondary nozzle portion extends annularly about the centerbody, and is concentrically aligned with the centerbody about a centerline of the upper stage rocket.

8. The multi-stage rocket of claim 4, wherein, in a cross-sectional plane parallel to a centerline of the upper stage rocket, a width of the centerbody continuously decreases in a downstream direction.

9. The multi-stage rocket of claim 4, wherein the upper stage rocket further includes a seal that allows the centerbody to gimbal relative to the outer expansion surface.

10. The multi-stage rocket of claim 1, wherein, in a cross-sectional plane parallel to a centerline of the upper stage rocket, a width of the expansion cavity continuously increases in a downstream direction.

11. The multi-stage rocket of claim 1, wherein, in a cross-sectional plane parallel to a centerline of the upper stage rocket, the outer expansion surface has a curved contour.

12. The multi-stage rocket of claim 1, wherein a contour of the outer expansion surface is curved such that, during in-space operation of the propulsion engine, the outer expansion surface captures a flow of the gas generated by the propulsion engine and turns the flow in a direction parallel to a centerline of the upper stage rocket to generate thrust.

13. The multi-stage rocket of claim 1, wherein the base includes a first base portion inboard of the nozzle exit and a second base portion outboard of the nozzle exit;

wherein the upper stage rocket further includes a sidewall extending from the base toward the nose; and wherein the second base portion extends between the nozzle exit and the sidewall.

14. The multi-stage rocket of claim 13, wherein the outer expansion surface of the secondary nozzle portion remains positionally fixed relative to the sidewall.

15. The multi-stage rocket of claim 1, wherein the base includes a first base portion inboard of the nozzle exit and a second base portion outboard of the nozzle exit;

wherein the base has a dome shape defined by the first base portion and the second base portion.

16. The multi-stage rocket of claim 1, wherein the propulsion engine is configured to provide propulsive thrust during nose-first travel of the upper stage rocket and retro-propulsive thrust during base-first travel of the upper stage rocket.

17. The multi-stage rocket of claim 1, wherein the propulsion engine is configured such that, during atmospheric landing of the upper stage rocket, a jet of high pressure gas exits the high pressure chamber and expands along the inner expansion surface of the secondary nozzle portion, and the jet does not interact with the outer expansion surface of the secondary nozzle portion.

18. The multi-stage rocket of claim 1, wherein the propulsion engine is configured such that, during in-space operation of the upper stage rocket, a jet of high pressure gas exits the high pressure chamber and expands along the inner expansion surface and the outer expansion surface of the secondary nozzle portion to produce thrust in a direction parallel to a centerline of the upper stage rocket.

19. The multi-stage rocket of claim 1, wherein the propulsion engine is configured such that, during atmospheric landing of the upper stage rocket, a jet of high pressure gas exits the high pressure chamber and expands along the inner expansion surface of the secondary nozzle portion, and the jet does not interact with the outer expansion surface of the secondary nozzle portion; and wherein the propulsion engine is configured such that, during in-space operation of the upper stage rocket, a jet of high pressure gas exits the high pressure chamber and expands along the inner expansion surface and the outer expansion surface of the secondary nozzle portion to produce thrust in a direction parallel to a centerline of the upper stage rocket.

20. The multi-stage rocket of claim 1, wherein the aerospike nozzle is an annular aerospike nozzle.

21. The multi-stage rocket of claim 1, wherein the aerospike nozzle is a linear aerospike nozzle.

22. An atmospheric re-entry vehicle, comprising:

a nose;

a base opposite the nose; and a propulsion engine toward the base, the propulsion engine including:

a high pressure chamber; and an aerospike nozzle configured to exhaust gas generated by the high pressure chamber, the aerospike nozzle including:

a converging-diverging nozzle portion;

a secondary nozzle portion downstream of the converging-diverging nozzle portion, the secondary nozzle portion including an inner expansion surface, an outer expansion surface outboard of the inner expansion surface, and an expansion cavity defined between the inner expansion surface and the outer expansion surface; and a nozzle exit at a downstream end of the secondary nozzle portion.

23. The atmospheric re-entry vehicle of claim 22, wherein the aerospike nozzle further includes an inflection point defined where the converging-diverging nozzle portion meets the outer expansion surface of the secondary nozzle portion.

24. The atmospheric re-entry vehicle of claim 22, wherein the converging-diverging nozzle portion includes a converging section, a diverging section downstream of the converging section, and a throat that defines a transition between the converging section and the diverging section;

wherein the diverging section of the converging-diverging nozzle portion includes an inner diverging surface and an outer diverging surface;

wherein the inner expansion surface of the secondary nozzle portion extends downstream of the inner diverging surface of the converging-diverging nozzle portion; and wherein an inflection point is defined where the outer diverging surface of the converging-diverging nozzle portion meets the outer expansion surface of the secondary nozzle portion.

25. The atmospheric re-entry vehicle of claim 22, wherein the base includes a first base portion inboard of the nozzle exit and a second base portion outboard of the nozzle exit;

wherein the secondary nozzle portion includes a centerbody; and wherein the centerbody includes a centerbody sidewall that defines the inner expansion surface and a centerbody base that defines the first base portion.

26. The atmospheric re-entry vehicle of claim 25, wherein the converging-diverging nozzle portion includes a converging section, a diverging section downstream of the converging section, and a throat that defines a transition between the converging section and the diverging section;

wherein the diverging section of the converging-diverging nozzle portion includes an inner diverging surface and an outer diverging surface;

wherein the inner expansion surface of the secondary nozzle portion extends downstream of the inner diverging surface of the converging-diverging nozzle portion; and wherein an inflection point is defined where the outer diverging surface of the converging-diverging nozzle portion meets the outer expansion surface of the secondary nozzle portion.

27. The atmospheric re-entry vehicle of claim 25, wherein the centerbody is a truncated toroidal aerospike.

28. The atmospheric re-entry vehicle of claim 25, wherein the expansion cavity of the secondary nozzle portion extends annularly about the centerbody, and is concentrically aligned with the centerbody about a centerline of the vehicle.

29. The atmospheric re-entry vehicle of claim 25, wherein, in a cross-sectional plane parallel to a centerline of the vehicle, a width of the centerbody continuously decreases in a downstream direction.

30. The atmospheric re-entry vehicle of claim 25, wherein the vehicle further includes a seal that allows the centerbody to gimbal relative to the outer expansion surface.

31. The atmospheric re-entry vehicle of claim 22, wherein, in a cross-sectional plane parallel to a centerline of the vehicle, a width of the expansion cavity continuously increases in a downstream direction.

32. The atmospheric re-entry vehicle of claim 22, wherein, in a cross-sectional plane parallel to a centerline of the vehicle, the outer expansion surface has a curved contour.

33. The atmospheric re-entry vehicle of claim 22, wherein a contour of the outer expansion surface is curved such that, during in-space operation of the propulsion engine, the outer expansion surface captures a flow of the gas generated by the propulsion engine and turns the flow in a direction parallel to a centerline of the vehicle to generate thrust.

34. The atmospheric re-entry vehicle of claim 22, wherein the base includes a first base portion inboard of the nozzle exit and a second base portion outboard of the nozzle exit;

wherein the vehicle further includes a sidewall extending from the base toward the nose; and wherein the second base portion extends between the nozzle exit and the sidewall.

35. The atmospheric re-entry vehicle of claim 34, wherein the outer expansion surface of the secondary nozzle portion remains positionally fixed relative to the sidewall.

36. The atmospheric re-entry vehicle of claim 22, wherein the base includes a first base portion inboard of the nozzle exit and a second base portion outboard of the nozzle exit; and wherein the base has a dome shape defined by the first base portion and the second base portion.

37. The atmospheric re-entry vehicle of claim 22, wherein the propulsion engine is configured to provide propulsive thrust during nose-first travel of the vehicle and retro-propulsive thrust during base-first travel of the vehicle.

38. The atmospheric re-entry vehicle of claim 22, wherein the propulsion engine is configured such that, during atmospheric landing of the vehicle, a jet of high pressure gas exits the high pressure chamber and expands along the inner expansion surface of the secondary nozzle portion, and the jet does not interact with the outer expansion surface of the secondary nozzle portion.

39. The atmospheric re-entry vehicle of claim 22, wherein the propulsion engine is configured such that, during in-space operation of the vehicle, a jet of high pressure gas exits the high pressure chamber and expands along the inner expansion surface and the outer expansion surface of the secondary nozzle portion to produce thrust in a direction parallel to a centerline of the vehicle.

40. The atmospheric re-entry vehicle of claim 22, wherein the propulsion engine is configured such that, during atmospheric landing of the vehicle, a jet of high pressure gas exits the high pressure chamber and expands along the inner expansion surface of the secondary nozzle portion, and the jet does not interact with the outer expansion surface of the secondary nozzle portion; and wherein the propulsion engine is configured such that, during in-space operation of the vehicle, a jet of high pressure gas exits the high pressure chamber and expands along the inner expansion surface and the outer expansion surface of the secondary nozzle portion to produce thrust in a direction parallel to a centerline of the vehicle.

41. The atmospheric re-entry vehicle of claim 22, wherein the aerospike nozzle is an annular aerospike nozzle.

42. The atmospheric re-entry vehicle of claim 22, wherein the aerospike nozzle is a linear aerospike nozzle.

43. The atmospheric re-entry vehicle of claim 22, wherein the atmospheric re-entry vehicle is an upper stage rocket.

44. The atmospheric re-entry vehicle of claim 22, wherein the atmospheric re-entry vehicle is a spacecraft.

45. An atmospheric re-entry vehicle, comprising:

a nose;

a base opposite the nose; and a propulsion engine toward the base, the propulsion engine including:

a high pressure chamber; and a nozzle configured to exhaust gas generated by the high pressure chamber, the nozzle including:

an initial nozzle portion;

a secondary nozzle portion downstream of the initial nozzle portion, the secondary nozzle portion including an inner expansion surface, an outer expansion surface outboard of the inner expansion surface, and an expansion cavity defined between the inner expansion surface and the outer expansion surface; and a nozzle exit at a downstream end of the secondary nozzle portion.

46. The atmospheric re-entry vehicle of claim 45, wherein the nozzle further includes an inflection point defined where the initial nozzle portion meets the outer expansion surface of the secondary nozzle portion.

47. The atmospheric re-entry vehicle of claim 45, wherein the initial nozzle portion includes a converging section, a diverging section downstream of the converging section, and a throat that defines a transition between the converging section and the diverging section;

wherein the diverging section of the initial nozzle portion includes an inner diverging surface and an outer diverging surface;

wherein the inner expansion surface of the secondary nozzle portion extends downstream of the inner diverging surface of the initial nozzle portion; and wherein an inflection point is defined where the outer diverging surface of the initial nozzle portion meets the outer expansion surface of the secondary nozzle portion.

48. The atmospheric re-entry vehicle of claim 45, wherein the base includes a first base portion inboard of the nozzle exit and a second base portion outboard of the nozzle exit;

wherein the secondary nozzle portion includes a centerbody; and wherein the centerbody includes a centerbody sidewall that defines the inner expansion surface and a centerbody base that defines the first base portion.

49. The atmospheric re-entry vehicle of claim 48, wherein the initial nozzle portion includes a converging section, a diverging section downstream of the converging section, and a throat that defines a transition between the converging section and the diverging section;

wherein the diverging section of the initial nozzle portion includes an inner diverging surface and an outer diverging surface;

wherein the inner expansion surface of the secondary nozzle portion extends downstream of the inner diverging surface of the initial nozzle portion; and wherein an inflection point is defined where the outer diverging surface of the initial nozzle portion meets the outer expansion surface of the secondary nozzle portion.

50. The atmospheric re-entry vehicle of claim 48, wherein the centerbody is a truncated toroidal aerospike.

51. The atmospheric re-entry vehicle of claim 48, wherein the expansion cavity of the secondary nozzle portion extends annularly about the centerbody, and is concentrically aligned with the centerbody about a centerline of the vehicle.

52. The atmospheric re-entry vehicle of claim 48, wherein, in a cross-sectional plane parallel to a centerline of the vehicle, a width of the centerbody continuously decreases in a downstream direction.

53. The atmospheric re-entry vehicle of claim 48, wherein the vehicle further includes a seal that allows the centerbody to gimbal relative to the outer expansion surface.

54. The atmospheric re-entry vehicle of claim 45, wherein, in a cross-sectional plane parallel to a centerline of the vehicle, a width of the expansion cavity continuously increases in a downstream direction.

55. The atmospheric re-entry vehicle of claim 45, wherein, in a cross-sectional plane parallel to a centerline of the vehicle, the outer expansion surface has a curved contour.

56. The atmospheric re-entry vehicle of claim 45, wherein a contour of the outer expansion surface is curved such that, during in-space operation of the propulsion engine, the outer expansion surface captures a flow of the gas generated by the propulsion engine and turns the flow in a direction parallel to a centerline of the vehicle to generate thrust.

57. The atmospheric re-entry vehicle of claim 45, wherein the base includes a first base portion inboard of the nozzle exit and a second base portion outboard of the nozzle exit;

wherein the vehicle further includes a sidewall extending from the base toward the nose; and wherein the second base portion extends between the nozzle exit and the sidewall.

58. The atmospheric re-entry vehicle of claim 57, wherein the outer expansion surface of the secondary nozzle portion remains positionally fixed relative to the sidewall.

59. The atmospheric re-entry vehicle of claim 45, wherein the base includes a first base portion inboard of the nozzle exit and a second base portion outboard of the nozzle exit; and wherein the base has a dome shape defined by the first base portion and the second base portion.

60. The atmospheric re-entry vehicle of claim 45, wherein the propulsion engine is configured to provide propulsive thrust during nose-first travel of the vehicle and retro-propulsive thrust during base-first travel of the vehicle.

61. The atmospheric re-entry vehicle of claim 45, wherein the propulsion engine is configured such that, during atmospheric landing of the vehicle, a jet of high pressure gas exits the high pressure chamber and expands along the inner expansion surface of the secondary nozzle portion, and the jet does not interact with the outer expansion surface of the secondary nozzle portion.

62. The atmospheric re-entry vehicle of claim 45, wherein the propulsion engine is configured such that, during in-space operation of the vehicle, a jet of high pressure gas exits the high pressure chamber and expands along the inner expansion surface and the outer expansion surface of the secondary nozzle portion to produce thrust in a direction parallel to a centerline of the vehicle.

63. The atmospheric re-entry vehicle of claim 45, wherein the propulsion engine is configured such that, during atmospheric landing of the vehicle, a jet of high pressure gas exits the high pressure chamber and expands along the inner expansion surface of the secondary nozzle portion, and the jet does not interact with the outer expansion surface of the secondary nozzle portion; and wherein the propulsion engine is configured such that, during in-space operation of the vehicle, a jet of high pressure gas exits the high pressure chamber and expands along the inner expansion surface and the outer expansion surface of the secondary nozzle portion to produce thrust in a direction parallel to a centerline of the vehicle.

64. The atmospheric re-entry vehicle of claim 45, wherein the nozzle is an annular aerospike nozzle.

65. The atmospheric re-entry vehicle of claim 45, wherein the nozzle is a linear aerospike nozzle.

66. The atmospheric re-entry vehicle of claim 45, wherein the atmospheric re-entry vehicle is an upper stage rocket.

67. The atmospheric re-entry vehicle of claim 45, wherein the atmospheric re-entry vehicle is a spacecraft.

68. The atmospheric re-entry vehicle of claim 45, wherein the propulsion engine is a plug cluster engine.

69. The atmospheric re-entry vehicle of claim 68, wherein the high pressure chamber is a first high pressure chamber of a plurality of high pressure chambers that are spaced relative to one another;

wherein the initial nozzle portion is a first initial nozzle portion of a plurality of initial nozzle portions that are spaced relative to one another; and wherein each initial nozzle portion of the plurality of initial nozzle portions is disposed relative to corresponding high pressure chamber of the plurality of high pressure chambers.

\* \* \* \* \*